(12) United States Patent
Scoggins et al.

(10) Patent No.: US 10,894,233 B2
(45) Date of Patent: Jan. 19, 2021

(54) SILICON CARBIDE FILTER MEMBRANE AND METHODS OF USE

(71) Applicant: Entegris, Inc., Billerica, MA (US)

(72) Inventors: Troy Scoggins, Decatur, TX (US); Abuagela Rashed, Denton, TX (US)

(73) Assignee: ENTEGRIS, INC., Billerica, MA (US)

(*) Notice: Subject to any disclaimer, the term of this patent is extended or adjusted under 35 U.S.C. 154(b) by 121 days.

(21) Appl. No.: 16/027,896

(22) Filed: Jul. 5, 2018

(65) Prior Publication Data

US 2019/0009201 A1 Jan. 10, 2019

Related U.S. Application Data

(60) Provisional application No. 62/529,292, filed on Jul. 6, 2017.

(51) Int. Cl.
*B01D 69/12* (2006.01)
*B01D 71/02* (2006.01)

(52) U.S. Cl.
CPC .......... *B01D 69/12* (2013.01); *B01D 71/02* (2013.01); *B01D 2325/02* (2013.01); *B01D 2325/04* (2013.01)

(58) Field of Classification Search
CPC ..... B01D 61/12; B01D 71/02; B01D 39/2082
See application file for complete search history.

(56) References Cited

U.S. PATENT DOCUMENTS

| | | | |
|---|---|---|---|
| 4,394,271 A | 7/1983 | Groteke | |
| 7,112,237 B2 | 9/2006 | Zeller | |
| 9,029,813 B2 | 5/2015 | Fomenkov | |
| 2008/0174040 A1* | 7/2008 | Saukaitis | B01D 53/228 264/48 |
| 2011/0100910 A1* | 5/2011 | Johansen | B01D 39/2068 210/636 |
| 2016/0121272 A1 | 5/2016 | Drury | |
| 2017/0072370 A1 | 3/2017 | Ehlen | |

FOREIGN PATENT DOCUMENTS

| | | |
|---|---|---|
| CN | 103064260 A | 4/2013 |
| KR | 19980020827 A | 6/1998 |
| TW | 460316 | 10/2001 |
| WO | 2017007709 A1 | 1/2017 |
| WO | 2017102261 W | 6/2017 |

* cited by examiner

*Primary Examiner* — Krishnan S Menon
(74) *Attorney, Agent, or Firm* — Entegris, Inc.

(57) ABSTRACT

Described are silicon carbide filters for use with liquid metals such as liquid tin, as well as methods of using such a filter to remove particles from the liquid metal, and systems and processes that use the filtered liquid metal.

19 Claims, 2 Drawing Sheets

SILICON CARBIDE FILTER MEMBRANE AND METHODS OF USE

CROSS REFERENCE TO RELATED APPLICATIONS

This application claims the benefit under 35 USC 119 of U.S. Provisional Patent Application No. 62/529,292 filed Jul. 6, 2017, the disclosure of which is hereby incorporated herein by reference in its entirety for all purposes.

FIELD OF THE INVENTION

The following description relates to silicon carbide filters for use with liquid metals such as liquid tin, as well as methods of using such a filter to remove particles from the liquid metal, and systems and processes that use the filtered liquid metal.

BACKGROUND

Various industrial processes incorporate the use of a metal in a liquid form. In one example (see U.S. Pat. No. 7,897,947, the entirety of which is incorporated herein by reference) liquid tin is used in a system for producing extreme ultraviolet radiation (EUV radiation), which is radiation that has a wavelength of about 50 nanometers or less (sometimes referred to as "soft x-rays"). Extreme ultraviolet radiation can be used in photolithography processes to produce extremely small features in a semiconductor or microelectronic device substrate, for example, a silicon wafer. Methods to produce EUV radiation include converting a material into a plasma state that contains a constituent element, for example tin, with an emission line in the EUV range. In one such method, often termed "laser produced plasma" ("LPP"), the plasma can be produced by irradiating a target material that includes liquid tin in the form of a droplet, with an amplified light beam.

When used in these types of processes, equipment and systems for providing the liquid tin to generate the EUV radiation will normally include a filter that is used to remove particulates from the liquid tin. The filtration step is often performed at high temperature, for example at a temperature greater than 200° C., and at a pressure that can be greater than atmospheric, sometimes much greater. For these uses and others, various industries and manufacturing companies require methods and systems that are capable of efficiently and effectively filtering a molten metal such as liquid tin. Various technologies exist at present for filtering liquid tin, for example for the purpose of supplying liquid tin to a process for generating EUV radiation. Still, improvements in systems and methods for filtering liquid metals, with the goal of more efficient or more effective filtering methods of a liquid metal, are always desired.

SUMMARY

Systems and method that use a liquid metal in a manufacturing process, such as those that use liquid tin to produce EUV radiation, must overcome certain unique and difficult challenges that exist in handling a liquid metal. For one, handling a liquid metal usually requires handling the liquid at a very high temperature. High temperatures create various challenges with respect to safely and efficiently achieving, maintaining, and controlling the required high temperature condition, and with respect to the stress that high temperature operations place on equipment during use. If the system is also at a greater than atmospheric pressure, still additional challenges are present.

Liquid tin is uniquely reactive with most metal and non-metal materials and is capable of forming solid particulates with many materials to which the liquid tin may be exposed during handling at a high temperature. The particulates may cause detrimental effects in downstream processing and use of the liquid tin, such as plugging of downstream equipment through which the liquid tin must be reliably allowed to flow. In the case of using liquid tin to produce EUV radiation, particulates formed during handling of high temperature liquid tin may clog downstream systems such as a droplet generator in an EUV light generator. As another challenge in processing liquid tin for a system that generates EUV radiation, the liquid tin will be alternately liquefied and solidified, i.e., thawed and frozen, during cycles of use. Freezing and thawing the tin causes stress on all components of the liquid tin handling system, including filter membranes. The filter membranes, which may be in the form of thin porous ceramic materials, are susceptible to being broken, fragmented, or otherwise degraded if overly stressed when surrounded by a volume of tin that is repeatedly frozen and liquefied.

In certain embodiments, porous silicon carbide is one material that can be adapted to exhibit properties that may allow its use in a filter. Porous silicon carbide is substantially inert, even in the presence of highly-reactive liquid tin. According to the present description, Applicant has identified that porous silicon carbide can be formed into a porous silicon carbide filter membrane that can be effective to remove particulates from a flow of liquid tin at high operating temperatures. Example filter membranes are also capable of withstanding stresses on the filter that are present during operation at high temperatures usually involved in handling liquid tin and other liquid metals, as well as stresses caused by exposing a filter membrane to repeated cycles of freezing and thawing.

In some attempts to use porous silicon carbide in a filter membrane for use in filtering high temperature liquid tin, the porous silicon carbide filter membrane itself has been found to produce particulates that have the potential to become incorporated into liquid tin that is being passed through the filter membrane for filtration. In specific, the solid material of the porous silicon carbide filter membrane was found to be capable of producing tiny pieces of the solid silicon carbide material at its surfaces. Surfaces of the silicon carbide were found to produce particulates (i.e., to "particulate") that might become removed from the surface, during use, by a flow of liquid tin passing through the silicon carbide for filtration.

Some attempts at using porous silicon carbide to form a thin, porous filter membrane useful to remove particulates from liquid tin have involved a single layer of porous silicon carbide as the filter membrane, with the porous silicon carbide material having a fine pore size. Analysis of the membrane, having a fine pore size, shows that the membrane can produce, at its surfaces, very small silicon carbide particulates. If the small pore sized membrane were used as a filter, the silicon carbide particulates would have the potential to become released from the membrane and enter the flow of liquid metal (e.g., tin) that is being passed through the filter.

Porous silicon carbide is considered to be potentially friable, brittle, or otherwise susceptible to flaking or loss of small pieces of material from its surface as particulates. This occurrence of the forming and flaking off of particulates is sometimes referred to as "particulation." By this process, silicon carbide particulates may become present at surfaces of a porous silicon carbide material. Particulation may be further encouraged or worsened during use of a silicon carbide material as a filter membrane, due to mechanical stressing of the porous silicon carbide. Ultimately, the silicon carbide material of the membrane may "particulate," i.e., small silicon carbide fragments, flakes, or pieces (i.e., "particulates") may be formed at the membrane surface and can be detached, removed, or separated from the surface. If separated from the membrane surface during use of the membrane as a filter, these particulates are introduced into liquid passing though the filter.

Desirably, a preferred silicon carbide filter membrane would not be susceptible to producing silicon carbide particulates at surfaces of the membrane during use; or, in the event that such particles may be produced, a preferred silicon carbide filter membrane may not allow any such particulates to become present in a flow of liquid that passes through the filter membrane.

As described herein, Applicant has now discovered that filter membranes can be prepared using multiple (two or more) membrane layers of porous silicon carbide, with at least two of the membrane layers having different pore sizes. Applicant has also discovered that these multi-layer silicon carbide filter membrane can be less susceptible to forming silicon carbide particulates, or may otherwise prevent any such particulates that are formed from becoming introduced into a flow of liquid that passes through the multi-layer filter membrane.

For example, a filter membrane as described may include a first membrane layer that is a fine membrane layer, made of material that is fine porous silicon carbide, meaning that the porous silicon carbide contains pores of a relatively small pore size. The filter membrane as described also includes a second membrane layer that is a coarse membrane layer, made of material that is coarse porous silicon carbide, meaning that the porous silicon carbide contains pores of a relatively larger pore size compared to those of the fine membrane layer. Average pore size of a fine or coarse membrane layer of a multi-layer membrane can be any useful pore size, which normally is in a range of microns (as opposed to nanometers), provided that the average pore size of the fine membrane layer is smaller than the average pore size of the coarse membrane layer. For porous silicon carbide of a fine membrane layer, examples of average pore sizes may be less than 2.0 microns. For porous silicon carbide of a coarse membrane layer, average pore size will be greater than the average pore size of the fine membrane layer of the same multi-layer membrane, with examples of average pore sizes being greater than about 2 microns, e.g., greater than 2.05 microns, for example up to about 10 microns.

Applicant has found that a multi-layer silicon carbide filter membrane as described herein can be useful in a system and method for filtering (i.e., removing particulate materials from) a flow of liquid metal, such as liquid tin, and that the multi-layer filter membrane is less prone to particulation (i.e., the formation of silicon carbide particles at surfaces of the membrane) and is consequently less prone to introducing silicon carbide particulates into a flow of liquid metal (e.g., tin) that is passed through the filter during use.

Examples of multi-layer silicon carbide filter membranes as described have been found to have a reduced amount of silicon carbide particulates at surfaces (e.g., downstream surfaces) of the filter membrane. The Applicant has determined that a multi-layer filter membrane as described, which includes a coarse porous silicon carbide material, is less susceptible to particulation; more particularly, the coarse porous silicon carbide material is less susceptible to particulation as compared to a fine porous silicon carbide material. With a coarse membrane layer being used on a downstream side of a fine membrane layer, the amount of silicon carbide particulates present at downstream surfaces of a multi-layer membrane is reduced, e.g., substantially, relative to the amount of silicon carbide particulates that are present at comparable downstream surfaces of a single-layer silicon carbide membrane made of fine porous silicon carbide material.

As a showing of this improved feature of a multi-layer silicon carbide filter membrane as described, relative to a comparable single-layer membrane made of fine porous silicon carbide, one can observe that silicon carbide particulates can be found at downstream surfaces of a fine membrane layer. Detrimentally to a process that will used a liquid that passes through the filter membrane, these silicon carbide particles may be separated from, e.g., dislodged or released, the surface of the porous silicon carbide and introduced into the flow of liquid, allowing the particulates to be passed to a downstream processing device.

According to example filter membranes of the present description, a multi-layer porous silicon carbide filter membrane as described, which includes both a fine membrane layer and a coarse membrane layer, with the coarse membrane layer being located at a downstream location relative to the fine membrane layer, will experience a substantially reduced occurrence of particulation at downstream surfaces relative to the amount of particulation that would occur at downstream surfaces of a single-layer fine filter element. A multi-layer membrane as described shows a reduced amount of particulation of silicon carbide material at downstream surfaces of the filter, i.e., at downstream surfaces of the coarse porous silicon carbide layer. Advantageously, relative to the performance of the single-layer fine membrane, the multi-layer filter membrane reduces, substantially reduces, or preferably eliminates or nearly eliminates the amount of silicon carbide particulates that may become present at downstream surfaces of the silicon carbide filter membrane, e.g., at locations that would allow the silicon carbide particulates to be introduced from the filter membrane into a flow of liquid that is passing through the multi-layer membrane.

In one aspect, the invention relates to a multi-layer porous silicon carbide filter membrane. The membrane includes: a fine membrane layer of fine porous silicon carbide having a fine pore size, and a coarse membrane layer of coarse porous silicon carbide. The coarse porous silicon carbide has a pore size that is greater than the pore size of the fine porous silicon carbide.

In another aspect, the invention relates to a method of processing a liquid metal. The method includes providing a multi-layer silicon carbide filter membrane that includes: a fine membrane layer of fine porous silicon carbide having a fine pore size, and a coarse membrane layer of coarse porous silicon carbide having a coarse pore size, wherein the pore size of the coarse porous silicon carbide is greater than the pore size of the fine porous silicon carbide. The method also includes: passing the liquid metal through the multi-layer porous silicon carbide filter membrane by first passing the liquid metal through the fine membrane layer, and after passing the liquid metal through the fine membrane layer, passing the liquid metal through the coarse membrane layer.

Figure 1A:
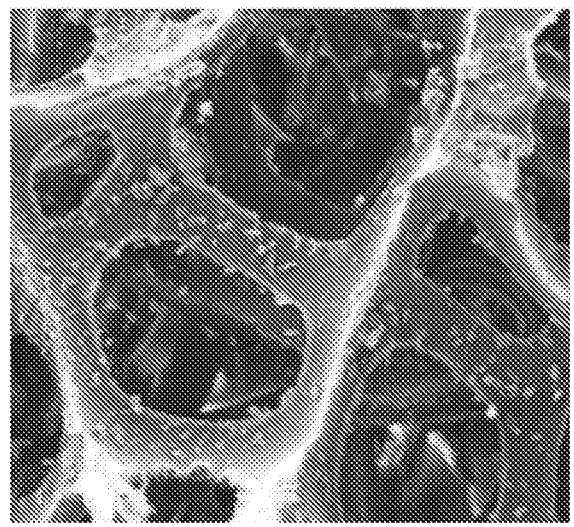
FIG. 1A is a photomicrograph produced using a scanning electron microscope of a swab that contains silicon carbide particulates taken from a filter membrane.

The figures are schematic and are not to scale.

DETAILED DESCRIPTION

Described as follows are multi-layer silicon carbide filter membranes that include two or more layers of porous silicon carbide, with at least two of the layer having pore sizes (e.g., average pore sizes) that differ. As determined by examination of various silicon carbide filter materials, exemplary multi-layer silicon carbide filter membranes can be prepared to exhibit a substantially reduced propensity to particulate at downstream surfaces; i.e., a multi-layer filter membrane as described can have or produce (by particulation) a reduced amount of silicon carbide particulates at downstream surfaces of the membrane, where the particulates may potentially become incorporated into a flow of liquid flowing through the membrane, relative to a comparable single-layer membrane made of fine porous silicon carbide.

An exemplary multi-layer filter membrane includes a first membrane layer that is referred to as a fine membrane layer, which is made of fine porous silicon carbide. The fine porous silicon carbide contains pores of a relatively small pore size. The multi-layer filter membrane also includes a second membrane layer that is a coarse membrane layer made of coarse porous silicon carbide, meaning that the porous silicon carbide contains pores of a relatively larger pore size compared to those of the fine membrane layer. An optional third (or fourth, etc.) membrane layer of porous silicon carbide may also be present, the third (or fourth, etc.) membrane layer having pores of any useful size, e.g., fine, coarse, etc.

According to the present invention, the Applicant has discovered that a multi-layer silicon carbide filter membrane as described can be useful in a system and method for filtering (i.e., removing particulate materials from) a flow of liquid metal, such as liquid tin. According to preferred uses of the multi-layer membrane to filter a flow of liquid metal, the metal can be caused to flow through the membrane in a direction of flow that causes the liquid metal to first pass through the fine membrane layer, and to subsequently (after passing through the fine member layer) pass through the coarse membrane layer.

Advantageously, multi-layer silicon carbide filter membranes as described have been found to have a reduced occurrence of silicon carbide particulation, i.e., a reduced amount of silicon carbide particulates that form or that are present at downstream surfaces of the filter membrane, compared to a single-layer membrane of fine silicon carbide. See, for example, FIGS. 1A and 1B, which show results of a test useful for detecting silicon carbide particulates at a surface of a silicon carbide filter membrane (before use of the membrane to filter (i.e., remove) particulates from a flow of liquid tin through the membrane). According to the test, a swab (e.g., a standard cleanroom wiping swab) was used to collect silicon carbide particulates from wetted surfaces of a downstream side of the membrane by rubbing on the wetted filter membrane surface to abrade and pick up loose or friable pieces of silicon carbide. If silicon carbide particulates are present at the tested surface the membrane, a sample of the particulates will be collected on the swab by contacting the swab with the surface, and the particulates can be viewed by use of a scanning electron microscope.

Referring now to FIG. 1A, this is an SEM photomicrograph of a swab that was used to collect silicon carbide particulates from a downstream surface of a single-layer silicon carbide filter membrane made of fine porous silicon carbide having an average pore size of less than 1 micron. As shown in the photomicrograph, a collection of silicon carbide particulates is present at surfaces of the swab. The silicon carbide particulates are the small irregularly-shaped, flake- or particle-like pieces that can be seen on the surfaces of the swab. Per the test for detecting silicon carbide particulates, these particulates of figure IA were collected by contacting the swab on a downstream surface of the described single-layer silicon carbide filter membrane prior to use.

Figure 1B:
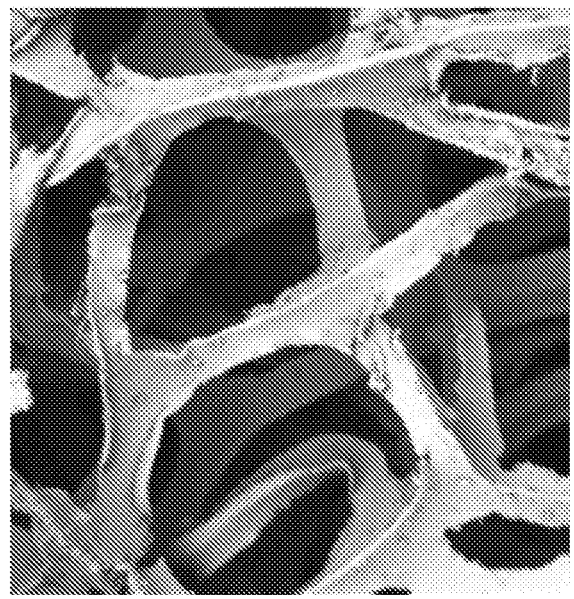
FIG. 1B is a photomicrograph produced using a scanning electron microscope of a swab that has been applied to an inventive filter membrane.

In comparison to FIG. 1A, FIG. 1B shows an SEM photomicrograph of a swab that was used to collect silicon carbide particulates from a downstream surface of a multi-layer silicon carbide filter membrane as described herein. The tested multi-layer silicon carbide filter membrane was made of fine (first) porous membrane layer of fine porous silicon carbide having an average pore size of less than I micron, in combination with a coarse (second) porous membrane layer of coarse porous silicon carbide having an average pore size of at least 2 microns. The swab was contacted with a surface of the coarse porous membrane to test whether the coarse porous membrane was susceptible to particulation. As shown, the swab, after being placed in contact with a surface of the coarse porous membrane, did not include a substantial amount of silicon carbide particulates, indicating that the coarse porous membrane of the tested multi-layer silicon carbide filter membrane did not have a substantial amount of silicon carbide particulates at the tested surface and can be considered to be less prone to producing silicon carbide particulates.

Without being bound by theory, the reason for the reduction in (preferably a substantial reduction in or a substantial absence of) silicon carbide particulates at downstream surfaces of a coarse membrane layer relative to a fine membrane layer, may be based on one or more factors that relate to: the structural features of the multi-layer filter membrane, mechanical properties (e.g., strength, rigidity) of the multiple layers (individually or in combination) of silicon carbide of the multi-layer filter membrane relative to a single-layer silicon carbide filter membrane, the basic propensity of different types (based, e.g., on pore size) of porous silicon carbide materials to particulate (i.e., shed small fragments or particles of its constituent silicon carbide, for any reason, during use).

For example, the strength of "fibrils" that make up a porous open cells structure of a porous silicon carbide material may be a significant factor in the propensity of the silicon carbide material to particulate. Porous silicon carbide can be considered to be made up of open cells defined by substantially solid materials in the form of cell walls, which include solid "fibril" structures that partially or completely define the cell walls or otherwise connect adjacent cells or cells walls as part of the porous (cellular) structure. The strength of fibrils of a porous silicon carbide material may relate, among other things, to porosity or pore size properties of a particular porous silicon carbide material. The porosity and pore size properties of the porous material may affect the dimensions (e.g., length or thickness) of the fibrils, which may in turn affect the strength of the fibrils and the propensity of the fibril to be affected by stress in a manner that would cause a fibril to particulate.

Thus, as a possible reason for the presently-described inventive reduction in particulates detected at surfaces of a coarse membrane layer of a multi-layer porous silicon carbide filter membrane, the strength of fibrils (e.g., as determined by the size, shape, and dimensions of the fibrils) of the porous silicon carbide material may relate to the propensity of the material to particulate. As a possible reason for an increased amount of silicon carbide particulates being present at downstream surfaces of a single-layer fine silicon carbide membrane, relative to a coarse membrane layer of a multi-layer silicon carbide membrane as described, the fibrils of the coarse silicon carbide material may have greater strength compared to the strength of fibrils of a fine silicon carbide material, resulting in reduced particulation occurring at surfaces of the fibrils of the coarse silicon carbide material. The surfaces of the downstream coarse silicon carbide material, having fibrils that have greater strength, may produce fewer silicon carbide particulates substantially because the coarse silicon carbide material is made of stronger fibrils that are less susceptible to fracturing or fragmenting at a surface in a manner that would result in the formation of silicon carbide particulates.

As another possible advantage of the presently-described multi-layer membrane, it is possible that to the extent that silicon carbide particulates do form on surfaces of a fine membrane layer of a multi-layer silicon carbide filter membrane, with the fine membrane layer being upstream from the coarse membrane layer during use, those particulates will be carried downstream into the coarse membrane layer, which effectively collects the silicon carbide particulates in a manner that does not allow a substantial amount of the particulates to become released into a flow of liquid passing through the multi-layer filter membrane.

A silicon carbide material made of porous silicon carbide and useful as a fine membrane layer or a coarse membrane layer can be characterized by structural properties of the porous silicon carbide that makes up the layer, including porosity (pore volume), pore size (e.g., "average pore size"), and optionally by "bubble point."

Porosity of a porous silicon carbide material is defined as the fraction of void space, as a percent, within the silicon carbide material, and can be determined by known methods of weight measurement. The porosity of porous silicon carbide generally may be over a range from as low as 4 percent by volume to as high as 95 percent by volume. For use as a membrane (fine or coarse) layer of a multi-layer silicon carbide filter membrane as described, silicon carbide may have any porosity that is desired or useful, with example porosities of a fine or coarse membrane layer being at least about 10 percent by volume, e.g., from 10, 12, or 15 to about 25 or 30 percent by volume. A useful or preferred range of porosity for a fine membrane may be, more particularly, in a range from about 13 to 30 percent, e.g., from about 15 to 27 percent, such as from about 20 to 25 percent. A useful or preferred range of porosity for a coarse membrane may be, more particularly, in a range from about 13 to 25 percent, e.g., from about 15 to 22 percent.

Pore size of a porous silicon carbide material is also a known feature of these and other porous ceramic materials, including these types of materials used as filters. Pore size is often reported as average pore size of a porous material, which can be measured by known techniques such as by mercury porosimetry. A standard test method for measuring porosity by mercury intrusion porosity is ASTM 4284.

Average pore size of a fine or coarse membrane layer of a multi-layer membrane can be any useful pore size, which normally is in a range of microns (as opposed to nanometers), provided that the average pore size of the fine membrane layer is smaller than the average pore size of the coarse membrane layer. For porous silicon carbide of a fine membrane layer, examples of average pore sizes may be less than 2.0 microns, e.g., less than about 1.8, 1.5, 1.2, or 1.0 micron. For porous silicon carbide of a coarse membrane layer, average pore size will be greater than the average pore size of the fine membrane layer of the same multi-layer membrane, with examples of average pore sizes being greater than about 2 microns, e.g., greater than 2.05 microns, for example up to about 10 microns, e.g., in a range from 2.0, 2.1, 2.5, or 3 to 8, 9, or 10 microns.

Bubble point of a porous silicon carbide material is also a known feature of these and other porous ceramic materials. By a bubble point test method, a sample of porous material (e.g., porous silicon carbide) is immersed in and wetted with a liquid having a known surface tension, and a gas pressure is applied to one side of the sample. The gas pressure is gradually increased. The minimum pressure at which the gas flows through the sample is called a bubble point.

A bubble point (presented as a pressure, for a given test system) of a fine or a coarse membrane layer of a multi-layer membrane as described can be any useful bubble point. The value of a bubble point for a given porous silicon carbide material of a fine or coarse membrane layer will depend on factors related to how a test is performed, such as the types of liquid and gas that are used to perform the test, as well as features of a sample being tested, such as thickness. When bubble point is measured using water as the liquid, a test pressure of 40 psi, nitrogen as the gas, and a sample thickness of 3.8 millimeters, an exemplary bubble point of a fine membrane layer for a multi-layer membrane may be in a range from 7 to 15 pounds per square inch (gauge). When bubble point is measured using water as the liquid, a test pressure of 40 psi, nitrogen as the gas, and a sample thickness of about 3.9 millimeters, an exemplary bubble point of a coarse membrane for a multi-layer membrane may be in a range from about 1 or 2 to about 20 or 25 pounds per square inch (gauge), e.g., from about 4 to 20 pounds per square inch (gauge). Alternately, bubble point may be measured according to ASTM F316.

A coarse or a fine membrane layer as part of a multi-layer membrane can have a thickness that is sufficient for the membrane layer to function as a membrane layer as described, and also to allow the membrane layer to be prepared, handled, and assembled into a multi-layer silicon carbide filter membrane as described. Generally, a porous silicon carbide membrane layer should have a thickness that, when assembled together with one or more other layers of a multi-layer filter membrane, will provide sufficient strength to withstand differential pressure of liquid metal (e.g., liquid tin) flowing through the filter during operation of a system that provides liquid tin for processing (e.g., for generating EUV radiation), and to withstand stress on the filter that can occur during start-up of a system as well as freeze-thaw cycles. A thickness of a fine membrane layer may be the same as a thickness of a coarse membrane layer, with example thicknesses being in a range from about 1 to 7, e.g., 1.5 to 5 millimeters (mm) (although thicknesses outside of these ranges may also be useful). A combined thickness of the fine membrane layer and the coarse membrane layer may be as desired, e.g., in a range from 1 to 15 mm, or from about 1.5 to 8, 10, or 12 mm.

A multi-layer porous silicon carbide membrane as described can take any form, shape, and size that will allow the membrane to be useful as a component of a filter for removing particulates from a flow of a liquid metal. Example forms of membranes may include shape features that are flat (planar), curved, cylindrical, conical, tubular (including optionally tapered), or a combination of these. For example, a multi-layer membrane may be cylindrical with one end that is closed and one end that is open, i.e., "closed-end cylindrical." See International Patent Publication WO 2017/007709, the entirety of which is incorporated herein by reference.

Figure 2A:
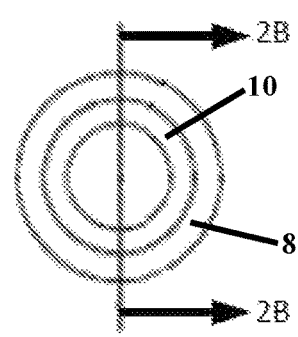
FIGS. 2A and 2B are schematic representations (side cross-section and end cross-section views, respectively) of an exemplary multi-layer filter membrane as described.
Figure 2B:
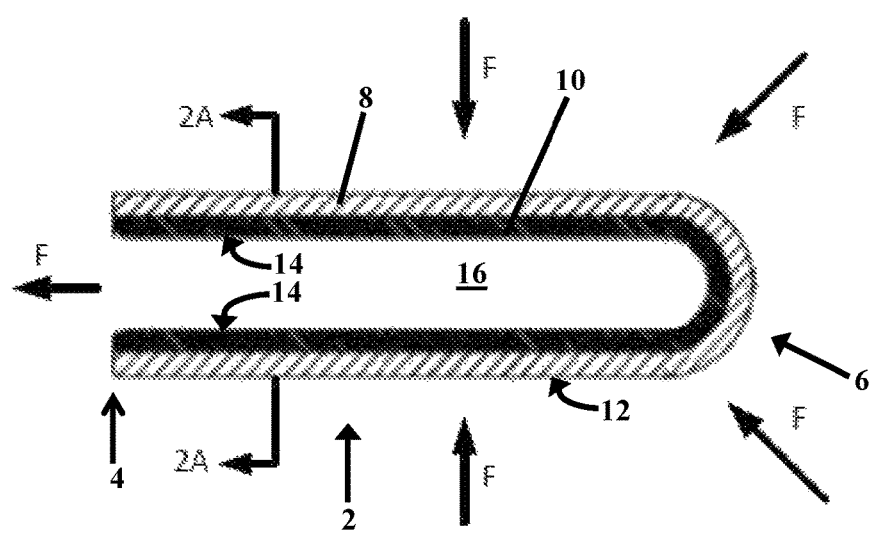

As an example of a multi-layer membrane of the present description, FIGS. 2A and 2B show multi-layer silicon carbide membrane 2 that includes fine membrane layer 8 made of fine porous silicon carbide having a fine pore size, and coarse membrane layer 10 of coarse porous silicon carbide having a coarse pore size. Multi-layer membrane 2 has a closed cylindrical shape, which includes a length of a cylinder extending between open end 4 and closed end 6. In use, a liquid metal such as liquid tin can be passed through the thicknesses of both membrane layers by initially entering fine membrane layer 8 at the exterior surface (or "upstream") surface 12. This direction of flow (F) is represented by arrows F. The flow of liquid metal passes first through the thickness of fine membrane layer 8, then contacts and passes through coarse membrane layer 10, eventually exiting coarse membrane layer 10 at interior (or "downstream") surface 14. The liquid metal then enters interior space 16 of closed-cylindrical membrane 2 and finally passes out the opening at open end 4.

Minimally, a multi-layer membrane includes two membrane layers, one being a fine membrane layer and a second being a coarse membrane layer as described. The layers can be arranged in the multi-layer membrane so that the fine membrane layer is "upstream" from the coarse membrane layer, so that liquid metal that flows through the multi-layer membrane passes first through the fine membrane layer and second through the coarse membrane layer. The fine and coarse membrane layers may be directly adjacent to each other, e.g., as shown at FIG. 2B; a downstream surface of the fine membrane layer may contact the upstream surface of the coarse membrane layer.

Optionally, a multi-layer membrane may include one or more additional membrane layers, in addition to the described fine membrane layer and coarse membrane layer. As a single example, a multi-layer silicon carbide filter membrane may include a third layer, which may be a coarse membrane layer that is adjacent to a fine membrane layer, and that is on a side of the fine membrane layer that is opposite of another coarse membrane layer. The construction would include a first coarse membrane layer, a first fine membrane layer, and a second coarse membrane layer, the three membrane layers being arranged for the fine membrane layer to be disposed between the two coarse membrane layers. A three (or more) layer membrane may be useful to allow the features of one or more of the membrane layers to be adjusted in a desired manner. For example, a three-layer membrane containing a fine membrane layer between two coarse membrane layers may allow for the fine membrane layer to have a reduced thickness compared to a thickness of a fine membrane layer of a two-layer membrane. Alternately, a three-layer membrane that contains a fine membrane layer between two coarse membrane layers may allow for an increase in flow rate through the three-layer membrane relative to a two-layer membrane of the same total thickness, while still providing useful filtering performance.

A multi-layer silicon carbide filter as described can be prepared by use of materials, techniques, steps, and processes that are known, e.g.: preparing porous graphite as a precursor to porous silicon carbide, shaping porous graphite into a form of a membrane layer of a multi-layer membrane, assembling multiple porous graphite membrane layers into a multi-layer porous graphite precursor to the multi-layer silicon carbide filter membrane, and then converting the porous graphite of the multi-layer porous graphite precursor to porous silicon carbide.

As a first step, porous graphite is provided for each of a fine porous silicon carbide membrane and a coarse porous silicon carbide membrane of a multi-layer filter membrane. Porous graphite is a material that is well known in the filtering arts, as well as other areas of manufacturing and technology. Porous graphite may be provided in solid (bulk) form, such as in the form of a block. According to the invention, a first piece of porous graphite can be provided, the first piece having a fine pore size. A second piece of porous graphite can also be provided, the second piece having a coarse pore size. The first piece of porous graphite, having a fine pore size, can be formed by any useful method (milling, machining, etc.) into the shape of a fine membrane layer, i.e., into a fine membrane layer "preform." The second piece of porous graphite, having a coarse pore size, can be formed by any useful method (milling, machining, etc.) into the shape of a coarse membrane layer, i.e., into a coarse membrane layer "preform." After forming the preforms, the preforms can be assembled into the form of a multi-layer membrane, for example in the form of a closed-end cylinder as illustrated at FIG. 2B.

After the graphite preforms are assembled into the form of a multi-layer membrane, the graphite of the assembly can be converted to silicon carbide by methods that are known. See, e.g., U.S. Pat. Nos. 8,142,845 and 7,931,853, the entireties of each of these being incorporated herein by reference. Useful processes for converting porous graphite into porous silicon carbide are well known. By one process, porous graphite can be converted to porous silicon carbide by exposing the porous graphite to silicon monoxide gas and elevated temperature (e.g., temperature in a range from 1400 to 2000 degrees Celsius) for a time that is sufficient for the graphite to be chemically converted to silicon carbide.

A multi-layer porous silicon carbide filter membrane as described can be useful for filtration of various materials such as liquid metals, at high temperature (e.g., greater than 200 or 300 Celsius), and at a pressure that may be atmospheric or greater than atmospheric (e.g., a pressure of 2, 10, 100, 1000 atmospheres). Systems with which the present multi-layer membranes may be used are described, for example, in PCT International Publication Number WO 2017/007709, as well as Unites States Patent Publication 2012/0280149, United States Patent Publication 2015/0293456, and U.S. Pat. No. 7,897,947, the entireties of which are incorporated herein by reference.

The WO 2017/007709 publication describes filter assemblies that are useful in processes of filtering a variety of liquid metals, gases, and supercritical fluids, with these fluids also being examples of fluids that can be filtered by multi-layer filter membranes as described herein. Examples of gases range from inert gases to corrosive gases, specifically including hydrogen bromide, argon, nitrogen, carbon dioxide, hydrogen chloride, and hydrides, and supercritical fluids, such as carbon dioxide in a supercritical state. Example liquid metals include tin, lithium, lead, sodium, cadmium, selenium, mercury, SnBr4, SnBn2, SnH4, tin-gallium alloys, tin-indium alloys, tin-indium-gallium alloys, or combinations thereof. Example temperatures of these systems may be in a range from 200 to 400 degrees Celsius, for example from about 250 to 300 degrees Celsius. Example pressures may be greater than atmospheric, e.g., up to about 8000 psig.

Examples of systems with which the presently-described multi-layer filter membranes can be used include those described in United States Patent Publication 2012/0280149. These and other examples of commercial systems involve the use and handling of liquid tin, or liquid-tin-containing liquids, for generating EUV radiation. Such methods and equipment perform steps of filtering the liquid metal, and can be adapted to incorporate a multi-layer membrane of the present description. In example methods, the liquid tin is formed into a droplet and the droplet is irradiated to emit extreme ultraviolet radiation.

According to various systems for preparing a liquid metal such as for use in a process that uses the liquid metal to produce EUV radiation, liquid metal is often held in a liquid metal bath above the melting temperature of the metal, such as at a temperature of at least 200, 220, or 240 250, 300, 350 degrees Celsius, or higher, depending on factors that include the melting temperature of the metal. The liquid flows through a filter that, per the present invention, can be a multi-layer membrane as described. During use, the flow of the liquid metal occurs at a relatively high pressure and a relatively high temperature, e.g., at least 200 degrees Celsius. The system may be in operation to supply liquid metal (e.g., liquid tin) for a processing purpose (e.g., to generate EUV radiation) on a non-continuous basis, meaning that a need for the supply of liquid metal can be temporary, such as for a period of minutes, hours, or days, but not necessarily for longer periods of time on a continuous basis. During periods of non-demand for the liquid metal, the system that maintains the source of liquid metal can be turned off, which will cause the liquid metal to solidify. When liquid metal is again needed for processing the system is turned back on and the solidified liquid tin is again heated to a molten state. During these cycles of heating and cooling, the multi-layer membrane remains submerged in the tin, which is solidified and liquefied while surrounding and contacting all surfaces of the multi-layer membrane.

As will be understood, a filter as described, and methods of supplying and processing a liquid metal, will be useful for supplying liquid metal for use in various commercial and industrial processes. One example is to supply liquid tin for generating EUV for use in lithography. See, for example, United States Patent Application 2012/0280149 and U.S. Pat. No. 8,598,551. Generally, a process and apparatus for lithography includes an EUV radiation source; an illumination system (illuminator) L configured to condition a radiation beam B of the EUV radiation; a support structure (e.g. a mask table) MT constructed to support a patterning device (e.g. a mask or a reticle) MA and connected to a first positioner PM configured to accurately position the patterning device; a substrate table (e.g. a wafer table) WT constructed to hold a substrate (e.g. a resist-coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure MT holds the patterning device MA in a manner that depends on the orientation of the patterning device, the design of the lithographic apparatus, and other conditions, such as whether or not the patterning device is held in a vacuum environment. The support structure can use mechanical, vacuum, electrostatic, or another clamping technique to hold the patterning device. The support structure may be a frame or a table, for example, which may be fixed or movable as required. The support structure may ensure that the patterning device is at a desired position, for example with respect to the projection system.

The term "patterning device" should be broadly interpreted as referring to any device that can be used to impart a radiation beam with a pattern in its cross-section such as to create a pattern in a target portion of the substrate. The pattern imparted to the radiation beam may correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The projection system, like the illumination system, may include various types of optical components, such as refractive, reflective, magnetic, electromagnetic, electrostatic, or other types of optical components, or any combination thereof, as appropriate for the exposure radiation being used, or for other factors such as the use of a vacuum. A vacuum environment may be provided to the whole beam path with the aid of a vacuum wall and vacuum pumps.

The illuminator IL receives an extreme ultraviolet (EUV) radiation beam. The EUV radiation beam can be generated by converting a droplet of liquid tin into a plasma state. In one such method, often termed laser produced plasma ("LPP") the plasma can be produced by irradiating a droplet of liquid tin with a laser beam.

The radiation beam B is incident on the patterning device (e.g. mask) MA, which is held on the support structure (e.g. mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and a position sensor (e.g. an interferometric device, linear encoder or capacitive sensor), the substrate table WT can be moved accurately, e.g. so as to position different target portions C in the path of the radiation beam B. Similarly, the first positioner PM and another position sensor can be used to accurately position the patterning device (e.g. mask) MA with respect to the path of the radiation beam B. Patterning device (e.g. mask) MA and substrate W may be aligned using mask alignment marks and substrate alignment marks.

What is claimed is:

1. A multi-layer porous silicon carbide filter membrane for filtering molten tin comprising:

a fine membrane layer of fine porous silicon carbide having a fine pore size and a porosity in a range of from 15 to 27 percent, and a coarse membrane layer of coarse porous silicon carbide having a coarse pore size and a porosity in a range of from 15 to 22 percent, the coarse pore size being greater than the fine pore size and the fine membrane layer being upstream of the course membrane layer.

2. The membrane of claim 1, wherein the fine porous silicon carbide has an average pore size of less than 2.0 microns.

3. The membrane of claim 1, wherein the fine porous silicon carbide has an average pore size of less than 1 micron.

4. The membrane of claim 1, wherein the coarse membrane has a pore size of greater than 2.0 microns.

5. The membrane of claim 1, wherein the fine porous silicon carbide has a bubble point of not greater than 15 pounds per square inch.

6. The membrane of claim 1, wherein the coarse porous silicon carbide has a bubble point of not greater than 20 pounds per square inch.

7. The membrane of claim 1, wherein the fine porous silicon carbide has a porosity in a range from 20 to 25.

8. The membrane of claim 1, wherein the fine membrane layer has a thickness in a range from 1 to 7 millimeters.

9. The membrane of claim 1, wherein the coarse membrane layer has a thickness in a range from 1 to 7 millimeters.

10. The membrane of claim 1, wherein a total thickness of the fine membrane layer and the coarse membrane layer is in a range from 1 to 15 millimeters.

11. The membrane according to claim 1, wherein:
the fine membrane layer has silicon carbide particulates that can be detected on a surface of the fine membrane layer, and
the coarse membrane layer has silicon carbide particulates that can be detected on a surface of the coarse membrane layer in an amount that is reduced relative to the amount of silicon carbide particulates that can be detected on a surface of the fine membrane layer.

12. A method of processing molten tin, the method comprising:
(a) providing a multi-layer porous silicon carbide filter membrane comprising:
  (i) a fine membrane layer of fine porous silicon carbide having a fine pore size and a porosity in a range of from 15 to 27 percent, and
  (ii) a coarse membrane layer of coarse porous silicon carbide having a coarse pore size and a porosity in a range of from 15 to 22 percent such that the pore size of the coarse porous silicon carbide is greater than the pore size of the fine porous silicon carbide and the fine membrane layer is upstream of the coarse membrane layer;
(b) passing the liquid metal through the multi-layer porous silicon carbide filter membrane by first passing the liquid metal through the fine membrane layer; and
(c) after passing the liquid metal through the fine membrane, passing the liquid metal through the coarse membrane layer.

13. The method of claim 12, wherein the liquid metal is at a temperature of at least 200 degrees Celsius.

14. The method of claim 12, wherein the fine porous silicon carbide has an average pore size of less than 2.0 microns.

15. The method of claim 12, wherein the coarse membrane has a pore size of greater than 2.0 microns.

16. The method of claim 12, wherein the fine porous silicon carbide has a porosity in a range from 20 to 25 percent.

17. The method of claim 12, wherein the fine membrane layer has a thickness in a range from 1 to 7 millimeters.

18. The method of claim 12, wherein the coarse membrane layer has a thickness in a range from 1 to 7 millimeters.

19. A method of generating EUV comprising
(a) providing a multi-layer porous silicon carbide filter membrane comprising:
  (i) a fine membrane layer of fine porous silicon carbide having a fine pore size and a porosity in a range of from 15 to 27 percent, and
  (ii) a coarse membrane layer of coarse porous silicon carbide having a coarse pore size and a porosity in a range of from 15 to 22 percent such that the pore size of the coarse porous silicon carbide is greater than the pore size of the fine porous silicon carbide and the fine membrane layer is upstream of the coarse membrane layer;
(b) passing liquid tin through the multi-layer porous silicon carbide filter membrane by first passing the liquid tin through the fine membrane layer;
(c) after passing the liquid tin through the fine membrane, passing the liquid tin through the coarse membrane layer;
(d) forming the liquid tin into a droplet; and
(e) irradiating the liquid tin to generate extreme ultraviolet radiation.

* * * * *